United States Patent [19]

Sakagawa et al.

[11] Patent Number: 4,941,887
[45] Date of Patent: Jul. 17, 1990

[54] QUINOPHTAHALONE DERIVATIVES FOR DYEING DENIM COTTON YARN, OPTIONALLY WITH INDIGO DYES TO GIVE YELLOW, GREEN OR BLACK SHADES

[76] Inventors: Tetsuo Sakagawa, 1-9-21, Koushien, Nishinomiya-shi, Hyougen-ken; Takayuki Nakayama, 4-20, Nishinaniwacho 5-chome, Amagasaki-ski, Hyougo-ken; Hisanobu Kunihiro, deceased, late of Nishinomiya; by Masako Kunihiro, legal representative, 21-11, Ohyacho, Nishinomiya-shi, Hyougo-ken, all of Japan

[21] Appl. No.: 147,206

[22] Filed: Jan. 22, 1988

[30] Foreign Application Priority Data

Jan. 23, 1987 [JP] Japan .................. 62-12594

[51] Int. Cl.$^5$ .................. C09B 67/22; D06P 1/22; D06P 3/60
[52] U.S. Cl. .................. 8/642; 8/478; 8/638; 8/649; 8/653; 8/662; 8/918; 546/145
[58] Field of Search .................. 8/662, 653, 642, 649; 546/145

[56] References Cited

U.S. PATENT DOCUMENTS

| | | | |
|---|---|---|---|
| 3,023,213 | 2/1962 | Richter | 8/657 |
| 3,770,746 | 11/1973 | Blackwell et al. | 8/532 |
| 4,199,317 | 4/1980 | Serex et al. | 8/471 |
| 4,820,685 | 4/1989 | Murata | 8/471 |

FOREIGN PATENT DOCUMENTS

| | | |
|---|---|---|
| 343925 | 11/1989 | European Pat. Off. |
| 59-051950 | 3/1984 | Japan |
| 1071187 | 6/1967 | United Kingdom |
| 1489456 | 10/1977 | United Kingdom |

OTHER PUBLICATIONS

E. R. Trotman, "Dyeing and Chemcal Technology of Texile Fibres," (Wiley-Interscience), Sixth edition, 1984, p. 420.

Heinrich Zollinger, "Color Chemistry," (VCH Publishers), 1987, p. 52.

*Primary Examiner*—A. Lionel Clingman
*Attorney, Agent, or Firm*—Fisher, Christen & Sabol

[57] ABSTRACT

Disclsoed herein is dye suitable for use in dyeing denim cotton yarns. The dye comprises at least one quinophthalone derivative represented by the following general formula (I) or (II):

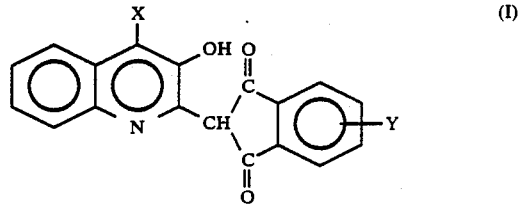

(I)

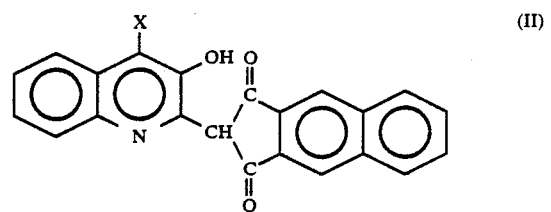

(II)

wherein X means H, Br or Cl and Y denotes H, COOR or —COOC$_2$H$_4$OR (R: alkyl), or a combination of said at least one quinophthalone derivative and an idigo dye. A dyeing process making use of the above dye and denim cotton yarns thus dyed are also disclosed.

3 Claims, No Drawings

QUINOPHTAHALONE DERIVATIVES FOR DYEING DENIM COTTON YARN, OPTIONALLY WITH INDIGO DYES TO GIVE YELLOW, GREEN OR BLACK SHADES

BACKGROUND OF THE INVENTION (1) Field of the Invention

This invention relates to dyeing of cotton yarns for denim. Specifically, this invention is concerned with a dye or dye composition suitable for use in dyeing cotton yarns such as denim warp yarns, a process for dyeing cotton yarns with the dye or dye composition, and a product dyed with the dye or dye composition.

(2) Description of the Related Art

Denim has found wide-spread utility in work clothing, ladies' trousers, children's apparel, etc. for its feeling of cotton to touch, durability and the like as a fabric for clothing.

Jeans made of such denim have been used widely for many years as clothing called "blue jeans". Such popularization of blue jeans has occurred for the following reasons. The characteristic shade of the fabric dyed with an indigo dye and its changes along the passage of time are favored. In addition, it is feasible to develop apparel while placing importance on fashion by making use of the above changes in shade.

Reflecting the recent diversification and expression of individuality in fashion, the demand has increased not only for blue jeans but also so-called color jeans such as yellow, green and black jeans. It is hence desired to color denim, a fabric for jeans, in various shades which range from a yellow or green color to a black color.

Sulfur dyes, vat dyes, reactive dyes and naphthol dyes are used to dye warp yarns for color denim so as to meet the popularization of color jeans.

Color jeans dyed using these dyes are however different in various properties from those dyed with indigo, and their values as goods ranging from dyed fabric to apparel are hence different from those of conventional jeans.

As mentioned above, blue jeans are favored as clothing owing to their characteristic color and various other properties inherent to them. Such properties are also desired for color jeans. Such properties are however not available from products dyed with sulfur dyes, vat dyes, reactive dyes, naphthol dyes or the like.

For example, blue jeans rope dyeing machines have conventionally been used widely to dye cotton yarns with indigo dyes. It is however difficult to apply such machines for dyeing cotton yarns with the above-mentioned dyes, since the dyeing and coloring behavior of these dyes are different significantly from that of indigo dyes. Moreover, effects of decoloration can hardly be expected from the bleaching of these dyes with chlorine. When bleaching is applied to black denim comprising warp yarns dyed in a black color with a dye composition of indigo and a conventional yellow threne dye, the blue color alone is decolored to allow the yellow color to remain so that the commercial value is impaired considerably. Namely, a rope-dyed product which has been dyed with a mixture of an indigo dye and another dye such as sulfur, vat, naphthol or reactive dye can scarcely expect such fading effects as those available with blue denim and is much less attractive from the standpoint of commercial value, because when bleached with chlorine, said another dye undergoes very little decoloration unlike the indigo dye.

As described above, there has still not been reported any dye which shows dyeing and coloring behavior similar to indigo and has similar properties. There is hence neither a dyeing process of cotton yarns making use of a novel dye having such properties nor cotton denim dyed with the novel dye or color jeans using such denim.

SUMMARY OF THE INVENTION

A first object of this invention is to provide a dye or dye composition which can exhibit dyeing and coloring behavior similar to indigo dyes and can also show properties similar to indigo dyes with respect to effects of decoloration upon bleaching.

A second object of this invention is to provide a rope dyeing-process of warp yarns for denim, in which the above-described dye or dye composition is used.

A third object of this invention is to provide a dyed product, like warp yarns for color denim, which has been dyed in a yellow color with the above-described dye or dye composition or in a color tone ranging from a green color to a black color by using the above-described dye or dye composition in combination with an indigo dye.

The above objects of the present invention have been achieved by using a specific quinophthalone derivative as a dyeing colorant. Namely, the sole use of the quinophthalone derivative permits coloration in a single specific color while its combined use with an indigo dye allows to dye in a green to black color. By using such a dye, dyed products similar to indigo dyes in the state of dyeing and coloration and the time-dependent changes can be obtained in accordance with a dyeing process similar to that employed for indigo dyes. The following process may be followed to dye cotton yarns with the quinophthalone derivative alone or with a dye composition containing both quinophthalone derivative and indigo dye. For example, a number of single yarns are put together into a form resembling a single rope, bound into the form of a tow, wound into a spherical shape. Numerous warp yarns, which have been wound separately into a spherical shape in the above-described manner, are then paid out at the same time and guided into several sets of dyebaths, which are each equipped with squeezing rolls and an airing device. Dyeing and oxidizing steps of short periods of time are thereafter repeated to dye the warp yarns gradually into a thicker color. Namely, a continuous dyeing process is used. Denim warp yarns in the form of ropes are immersed in a dyebath containing the quinophthalone derivative, squeezed and then exposed to air to oxidize the quinophthalone derivative. Color jeans ranging from a yellow color to a black color can be obtained by repeating the above steps.

DETAILED DESCRIPTION OF THE INVENTION

In general, warp yarns for blue jeans denim are dyed continuously by aligning a number of single yarns into a form resembling a single rope, binding them into the form of a tow, winding them into a spherical shape, simultaneously pulling out many warp yarns wound which have been wound into the spherical shape, guiding the warp yarns into several sets of dyebaths which are each filled with a solution of an indigo dye in its reduced form, and then repeating immersion, squeezing and oxidation steps of short time periods.

Although quinophthalone derivatives usually exhibit no dyeing and coloring ability for cotton when applied by any dyeing process for cellulose fibers, the present inventors have surprisingly found that cotton yarns can be dyed gradually into a thicker yellow color by repeating dyeing steps for denim warp yarns such as those mentioned above, namely, such quinophthalone derivatives exhibit dyeing and coloring behavior similar to indigo dyes and can perform rope-dyeing of denim warp yarns by repeating their immersion, squeezing and air oxidation. It has also been found that the resulting dyed product has good light fastness and shows properties similar to indigo dyes with respect to effects of decoloration when bleached with chlorine and regarding time-dependent changes. Owing to their closeness in dyeing and coloring behavior to indigo dyes, they can produce mixed colors typified by black colors through their combination with an indigo dye and can therefore meet the demand for color jeans, leading to completion of the present invention.

Quinophthalone derivatives useful in the practice of this invention are those represented by the following general formula (I) or (II);

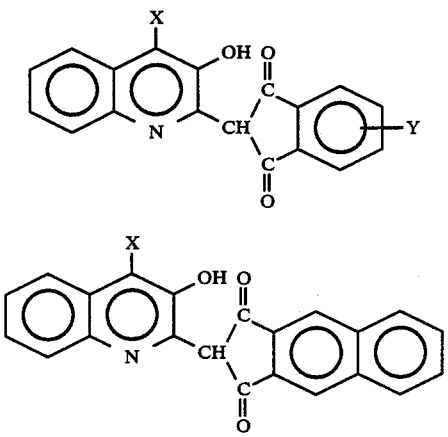

wherein X means H, Br or Cl and Y denotes H, COOR or —COOC$_2$H$_4$OR (R: alkyl). Further, dye compositions according to this invention each contains at least one of the above derivatives in combination with an indigo dye.

On the other hand, the dyeing process of this invention is a process for dyeing cotton yarns with any one of the above-described quinophthalone derivatives or a dye composition of at least one of the quinophthalone derivatives and an indigo dye, which comprises forming the cotton yarns into a shape resembling a rope, immersing them in a dyebath containing the above-described derivative or composition, squeezing them, exposing them to air to oxidize the quinophthalone derivative and in the case of the composition, the indigo dye contained therein, and repeating the immersion, squeezing and oxidation steps.

In addition, dyed products according to this invention are dyed by such a process.

The quinophthalone derivatives of this invention are represented by either one of the above general formulae. The following compounds may be mentioned as specific examples.

2-Phthaloylmethylidyne-3-hydroxyquinoline, 2-phthaloylmethylidyne-3-hydroxy-4-bromoquinoline, 2-(ethoxyethoxycarbonylphythaloylmethylidyne)-3-hydroxyquinoline, 2-(methoxycarbonylphthaloylmethylidyne)-3-hydroxyquinoline, 2-phthaloylmethylidyne-3-hydroxy-4-chloroquinoline, and 2-naphthaloylmethylidyne-3-hydroxyquinoline.

These derivatives present a wide range of yellow colors and can meet the demand for yellow jeans even when used singly. The dye composition of this invention contains one or more of the above-described quinophthalone derivative and an indigo dye. The quinophthalone derivatives may be used singly. Two or more of the quinophthalone derivatives may also be used in combination in accordance with each desired color shade.

In the composition containing at least one of the quinophthalone derivatives and an indigo dye, no particular limitation is imposed on their content ratio. It is possible to prepare various compositions capable of dyeing in colors ranging from a yellow color to a green or black color by mixing them at various ratios. For example, a dye composition containing 2-phthaloylmethylidyne-3-hydroxy-4-bromoquinoline and indigo at a ratio of about 4:6 may be used to obtain black jeans.

Although no particular limitation is imposed on the mixing ratio of the indigo dye and quinophthalone derivative, the dye composition may contain the indigo dye and quinophthalone derivative at a ratio of 1:9–9:1 depending on a hue desired. In addition, additives to various dye compositions, for example, 1–20 parts of a neutral inorganic salt such as anhydrous salt cake and 20 parts or less of an anionic surfactant such as lignin-type dispersant are incorporated to prepare the dye composition. The dye composition obtained in such a manner as described above is generally provided in the form of powder. The composition may however be provided in various forms such as powder, granules and paste in accordance with its application purposes.

Rope-dyeing of warp yarns for denim is practised in accordance with the dyeing process of this invention, which makes use of the dye or dye composition described above. Namely, the warp yarns are put together into the form of a rope or the like, immersed in a dyebath containing a quinophthalone derivative of the general formula (I) or (II) or the quinophthalone derivative and an indigo dye, squeezed, and then exposed to air to oxidize the quinophthalone derivative and where contained, the indigo dye. The immersion, squeezing and oxidation steps are repeated.

The dyebath containing such a quinophthalone derivative is prepared by adding, for example, caustic soda or an alkali mixture of caustic soda and soda ash as an alkali agent. The concentration of the quinophthalone derivative in the dyebath is determined in accordance with the desired intensity of its color on the resulting dyed product. In general, a concentrated solution containing the quinophthalone derivative in a range of 10–50 g/l is provided as a separate bath solution. Eyebaths whose concentrations range from 0.5 g/l to 10 g/l are then prepared individually by using the concentrated solution.

On the other hand, it is necessary to use the alkali at a concentration slightly higher than a level where the quinophthalone derivative is dissolved. It is however not absolutely necessary to dissolve the quinophthalone derivative completely in dyebaths.

In the process of the present invention, the above quinophthalone derivative may be used singly so as to obtain a product dyed in a yellow hue. It is also possible to use the quinophthalone derivative in combination with an indigo dye so that the dyed product may have a desired hue ranging from a green color to a black color by way of example.

In the latter case, dyeing may be carried out by causing the quinophthalone derivative and indigo dye to be contained in a same dyebath. As an alternative, a dyebath containing the quinophthalone derivative and a reduced bath containing the indigo dye in its reduced form may be prepared separately and dyeing may then be performed by using both baths.

For the preparation of a dyebath containing both quinophthalone derivative and indigo dye in combination, it is feasible to use the quinophthalone derivative and indigo dye provided separately or to employ the dye composition of the present invention.

When the quinophthalone derivative and indigo dye provided separately are used, the indigo dye is used first of all in an amount required to achieve a desired hue. An alkali required to reduce the indigo dye, for example, caustic soda and a reducing agent such as hydrosulfite are added. The indigo dye is then reduced at room temperature to 70° C. to prepare a reduced bath. Thereafter, the quinophthalone derivative is added to the reduced bath of the indigo dye to prepare a dyebath containing the thus-reduced indigo dye and the quinophthalone derivative in combination. When the dye composition of this invention, reducing agent and alkali in amounts required for the reduction are also added to prepare a dyebath.

In the process where a dyebath containing the quinophthalone derivative as a sole dye and a reduced bath containing the indigo dye alone are prepared separately to perform dyeing, the dyebath containing the quinophthalone derivative is prepared by a method in which an alkali is added as described above, while the reduced bath containing the indigo dye in its reduced form is prepared by adding caustic soda and hydrosulfite to a concentrated bath, which is not a dyebath and is to be reduced, and reducing the indigo dye at room temperature to 70° C. to prepare a concentrated and reduced bath and then forming a dyebath of a suitable concentration from the reduced bath.

A representative embodiment of the dyeing process of this invention is as follows. Namely, like usual warp yarns for blue jeans, a number of single yarns are put together into the form of a single rope, and are then bound into a tow-like shape. Using many warp yarns wound into spheres, they are paid out simultaneously, immersed for a short period of time in each of several sets of dyebaths filled with a dyeing solution or reduced solution prepared in a manner as described above, squeezed, and then exposed to air to oxidize the quinophthalone derivative or where the indigo dye is additionally employed, to oxidize both quinophthalone derivative and indigo dye. By repeating the above steps, the single yarns are dyed continually.

Where the dyebath containing the quinophthalone derivative and the reduced bath containing the indigo dye in its reduced form are provided as discrete baths, denim warp yarns are immersed in the dyebath containing the solution of the indigo dye in its reduced form. After squeezing them through a mangle, they are exposed to air to oxidize the indigo dye contained in its reduced form in the warp yarns. After repeating the above steps several times until the warp yarns have been dyed in a dark blue color, the warp yarns are immersed in a dyebath which contains an alkali-dissolved solution, or alkali solution of the quinophthalone derivative and hydrosulfite, so that the warp yarns are topped with a yellow color. In accordance with a hue desired for the denim warp yarns, this procedure is repeated several times so as to perform the topping. Dyeing of denim warp yarns in a mixed color is feasible by such a process. This process is preferable from the standpoint of workability.

In the process of this invention, it is possible to dye denim warp yarns gradually into a thicker color with the quinophthalone derivative by repeating their immersion in the alkali-dissolved solution without need for applying a reducing operation separately. However, the dyeing and coloring effects of the quinophthalone derivative may be enhanced by applying a reducing operation similar to that applied in the case of the indigo dye.

When the process of the present invention is applied to the continuous rope-dyeing of cotton warp yarns for denim, mixed colors ranging from a green color to a black color can be produced by mixing the yellow dye and the indigo dye. Resulting dyed products are good in light fastness and undergo decoloration by chlorine bleaching, and their changes in color along the passage of time are not different substantially from those dyed with the indigo dye.

Color denim can be produced by using the thus-obtained cotton yarns as warp yarns and twill-weaving them together with undyed or dyed yarns. The present invention can therefore meet the market demand for color jeans. The present invention will hereinafter be described by Examples, in which all designations of "part" or "parts" indicate part or parts by weight.

EXAMPLE 1

Water was added to a mixture of 50 parts of "Mitsui Indigo Pure-EX" (trade name; indigo produced by MITSUI TOATSU DYES LTD.), 40 parts of solid caustic soda and 45 parts of hydrosulfite to give a total weight of 1,000 parts. The resultant solution was heated at 70° C. for 15 minutes to obtain a concentrated solution of indigo in its reduced form. Added to 60 parts of the solution were 1 part of hydrosulfite, 0.5 part of caustic soda and water to give a total weight of 1,000 parts, whereby a dyebath of indigo was prepared. Cotton warp yarns for denim, which had been washed with warm water, were immersed at room temperature for 30 seconds in the dyebath. After squeezing the cotton warp yarns through a mangle, they were subjected to airing for 90 seconds. Those immersion, squeezing and airing steps were repeated 6 times. The warp yarns were then immersed at room temperature for 30 seconds in a quinophthalone dyebath of 2.5 parts of a dye represented by the following formula (III):

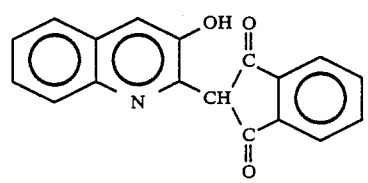

(III)

1.5 parts of solid caustic soda and water to 1,000 parts. After squeezing them through a mangle, they were subjected to airing for 90 seconds. Those steps were continued twice. When they were dried subsequent to their washing with water, cotton warp yarns of a black color for denim were obtained. That dyed product was excellent in light fastness. When immersed in a solution of 3 g/l of sodium hypochlorite with 10% of effective chlorine contained therein and then dried at 40° C. for 20 minutes to treat them effects of decoloration were obtained.

EXAMPLE 2

Water was added to a mixture of 8 parts of a quinophthalone derivative represented by the following formula (IV):

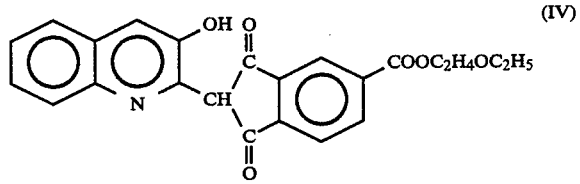

12 parts of "Mitsui Indigo Pure-EX" (trade name; indigo produced by MITSUI TOATSU DYES LTD.), 20 parts of hydrosulfite and 20 parts of solid caustic soda to give a total weight of 1,000 parts. The resultant solution was heated at 70° C. for 15 minutes to obtain a concentrated solution of the dyes in their reduced forms.

Added to 100 parts of the solution were 1 part of hydrosulfite, 0.5 part of caustic soda and water to give a total weight of 1,000 parts, whereby a dyebath was prepared. Cotton warp yarns for denim, which had been washed with warm water, were immersed at room temperature for 30 seconds in the dyebath. After squeezing the cotton warp yarns through a mangle, they were subjected to airing for 90 seconds. Those immersion, squeezing and airing steps were repeated 3 times, followed by water-washing and drying to obtain denim warp yarns of a dark green color.

The thus-dyed product had superb light fastness and when treated at 40° C. for 20 minutes in a solution of 3 g/l of sodium hypochlorite with 10% of effective chlorine contained therein, exhibited effects of decoloration.

EXAMPLE 3

When treated under the same conditions as in Example 2 except for the exclusion of "Mitsui Indigo Pure-EX", were obtained cotton warp yarns of a yellow color suitable for denim. The thus-dyed product had excellent light fastness and when treated at 40° C. for 20 minutes in a solution of 3 g/l of sodium hypochlorite with 10% of effective chlorine contained therein, was decolored into a pale yellowish white color.

EXAMPLE 4

A dye composition was prepared by adding and mixing 40 parts of 2-phthaloylmethylidyne-3-hydroxy-4-bromoquinoline and 5 parts of anhydrous salt cake with 60 parts of "Mitsui Indigo Pure-EX".

Water was added to a mixture of 20 parts of the dye composition, 20 parts of solid caustic soda and 20 parts of hydrosulfite to obtain 1,000 parts of a solution. The solution was heated at 70° C. for 15 minutes to prepare a concentrated solution of the dyes in their reduced forms. One part of hydrosulfite and 0.5 part of solid caustic soda were added to 250 parts of the thus-prepared solution, followed by an addition of water to prepare 1,000 parts of a dyebath. Cotton warp yarns for denim, which had been washed with warm water, were immersed at room temperature for 30 seconds in the dyebath. After squeezing the cotton warp yarns through a mangle, they were subjected to airing for 90 seconds. Those immersion, squeezing and airing steps were repeated 6 times, followed by water-washing and drying to obtain denim warp yarns of a black color.

The thus-dyed product had superb light fastness and when treated at 40° C. for 20 minutes in a solution of 3 g/l of sodium hypochlorite with 10% of effective chlorine contained therein, were decolored thoroughly into a lighter color density. They had a dark green color.

EXAMPLE 5

Continuous dyeing was conducted under the same conditions as in Example 1 except that 2-phthaloylmethylidyne-3-hydroxy-4-bromoquinoline was used in lieu of the compound of formula (III). Upon water-washing and subsequent drying, cotton warp yarns of a black color suitable for denim were obtained as in Example 1. They had excellent light fastness and when treated at 40° C. for 20 minutes in a solution of 3 g/l of sodium hypochlorite with 10% of effective chlorine contained therein, exhibited effects of decoloration. They had a dark green color.

EXAMPLE 6

When treated under the same conditions as in Example 3 except for the substitution of 2-phthaloylmethylidyne-3-hydroxy-4-bromoquinoline for the compound of the general formula (IV), were obtained cotton warp yarns of a yellow color suitable for denim. The thus-dyed product had excellent light fastness as in Example 3 and when treated at 40° C. for 20 minutes in a solution of 3 g/l of sodium hypochlorite with 10% of effective chlorine contained therein, was decolored into a pale yellow color.

COMPARATIVE EXAMPLE

Using C.I. Vat Yellow 2 ("Mikethren Yellow GCN", trade name; product of MITSUI TOATSU DYES LTD.), a representative yellow vat dye, and "Mitsui Indigo Pure-EX" (trade name; product of MITSUI TOATSU DYES LTD.), cotton warp yarns were dyed in the same manner as in Example 2. In order to compare the thus-dyed cotton warp yarns with those obtained in Example 2, their dyed states were observed and their decoloration tests were conducted in the following manner.

Dyed state: Some dyed yarns of each of the dyed product were cut off with a cutter knife and the cross-sections of their fibers were observed.

Decoloration test: The dyed products were each treated at 40° C. for 20 minutes in a solution of 3 g/l of sodium hypochlorite with 10% of effective chlorine contained therein.

Results are summarized in Table 1.

TABLE 1

|  | Comparative Example | Example 2 |
| --- | --- | --- |
| Dyed state | Green near the surface of each fiber, but yellow in a central part of the fiber. | Dyed in a black color in the form of a ring on the surface of each fiber but a central part of the fiber was neither dyed nor colored and |

TABLE 1-continued

| | Comparative Example | Example 2 |
|---|---|---|
| Decoloration test | The dyed yarns had a green color. After decoloration, a yellowish color remained | remained so-called "center white". After decoloration, the color became paler as a whole. The hue was a dark green color |

What is claimed is:

1. A rope-dyeing process of denim cotton yarns, which comprises repeating the following consecutive steps:
   (i) immersing the yarns in the form of a rope in a dyebath which contains at least one member from the group consisting of (a) at least one quinophthalone derivative represented by the following general formula (I) or (II):

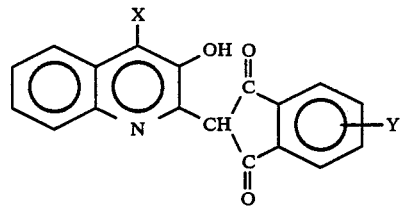

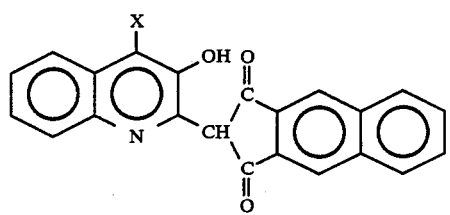

wherein X means H, Br or Cl and Y denotes H, COOR or —COOC$_2$H$_4$OR, wherein R is alkyl, and (b) a combination of said at least one quinophthalone derivative and an indigo dye;
   (ii) squeezing the yarns; and
   (iii) exposing the yarns to air to oxidize said at least one quinophthalone derivative.

2. Denim yarns rope-dyed with at least one member from the group consisting of (a) at least one quinophthalone derivative represented by the following general formula (I) or (II):

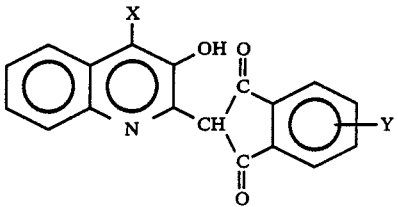

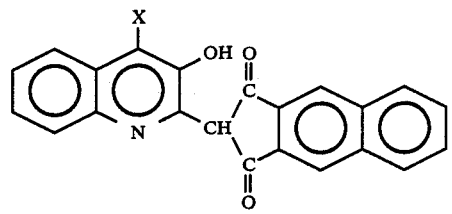

wherein X means H, Br or Cl and Y denotes H, COOR or —COOC$_2$H$_4$OR, wherein R is alkyl, and (b) a combination of said at least one quinophthalone derivative and an indigo dye.

3. A composition dye suitable of use in rope dyeing denim cotton yarns, comprising an indigo dye and at least one quinophthalone derivative represented by the following general formula (I) or (II):

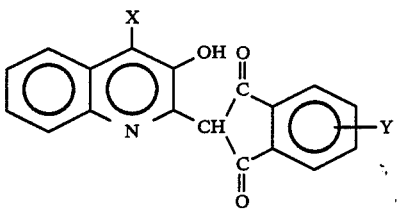

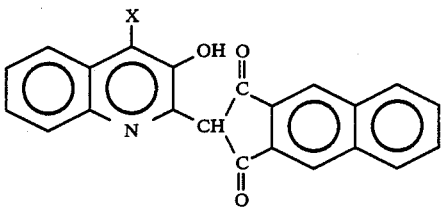

wherein, in Formula (I), X is H and Y is COOC$_2$H$_4$OR, wherein R is alkyl, or X is Br and Y is COOR and COOC$_2$H$_4$OR, wherein R is alkyl, or X is Cl and Y is H, COOR or COOC$_2$H$_4$OR, wherein R is alkyl, and wherein, in Formula (II), X is Br or Cl.

* * * * *

UNITED STATES PATENT AND TRADEMARK OFFICE
CERTIFICATE OF CORRECTION

PATENT NO. : 4,941,887

DATED : July 17, 1990

INVENTOR(S) : Tetsuo SAKAGAWA et al.

It is certified that error appears in the above-identified patent and that said Letters Patent is hereby corrected as shown below:

On the title page, Item [76] should read

"Takanobu Kunihiro", deceased

Signed and Sealed this

Eighteenth Day of June, 1991

Attest:

HARRY F. MANBECK, JR.

Attesting Officer

Commissioner of Patents and Trademarks